United States Patent [19]

Takehara et al.

[11] Patent Number: 5,666,279
[45] Date of Patent: Sep. 9, 1997

[54] VOLTAGE RESONANCE INVERTER CIRCUIT FOR DIMABLE COLD CATHODE TUBES

[75] Inventors: Takao Takehara, Iwata-gun; Shingo Okada, Saijou, both of Japan

[73] Assignee: Minebea Co., Ltd., Kitasaku-gun, Japan

[21] Appl. No.: 562,178

[22] Filed: Nov. 22, 1995

[30] Foreign Application Priority Data

Nov. 24, 1994 [JP] Japan .................. 6-314156

[51] Int. Cl.$^6$ .................................. H02M 7/539
[52] U.S. Cl. ................ 363/95; 363/97; 363/131
[58] Field of Search .................. 363/15, 16, 95, 363/97, 131

[56] References Cited

U.S. PATENT DOCUMENTS

| | | | |
|---|---|---|---|
| 5,216,585 | 6/1993 | Yasumura | 363/19 |
| 5,278,748 | 1/1994 | Kitajima | 363/21 |
| 5,448,465 | 9/1995 | Yoshida et al. | 363/15 |
| 5,450,307 | 9/1995 | Yasumura | 363/47 |
| 5,490,052 | 2/1996 | Yoshida et al. | 363/95 |
| 5,530,638 | 6/1996 | Wu | 363/97 |

Primary Examiner—Jeffrey L. Sterrett
Attorney, Agent, or Firm—Staas & Halsey

[57] ABSTRACT

An object of the present invention is to provide a voltage resonance inverter circuit capable of performing constantly a zero-voltage switching action in response to a change in the input voltage. For achievement of the above object of the present invention, the capacitance of a voltage resonance capacitor is decreased in response to an increase of the input voltage thus increasing the characteristic impedance of a resonance circuit. This will increase the amplitude of a resonance voltage causing a zero-voltage switching action.

4 Claims, 8 Drawing Sheets

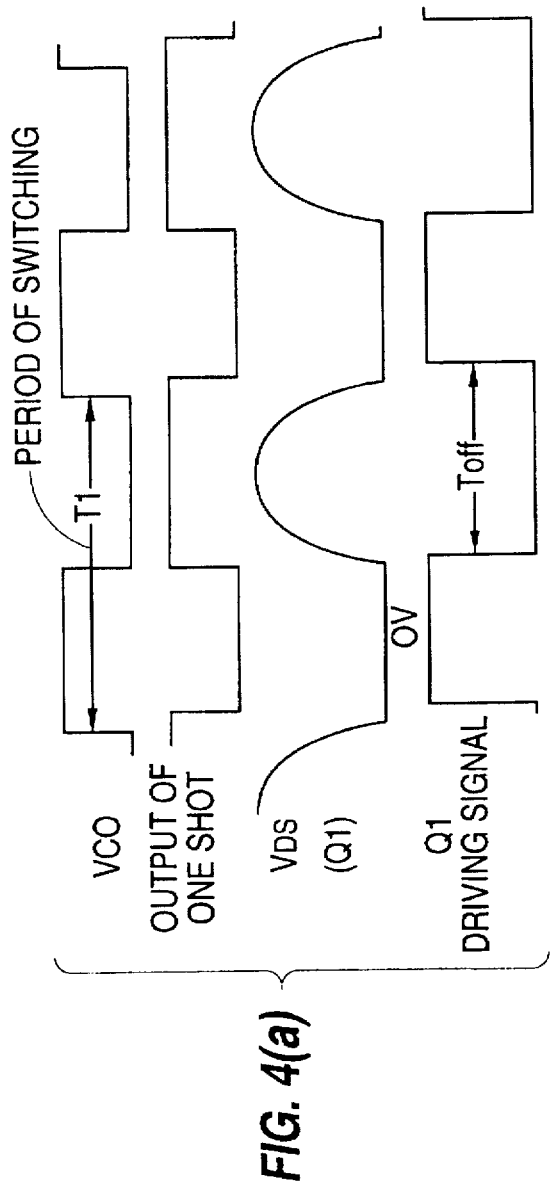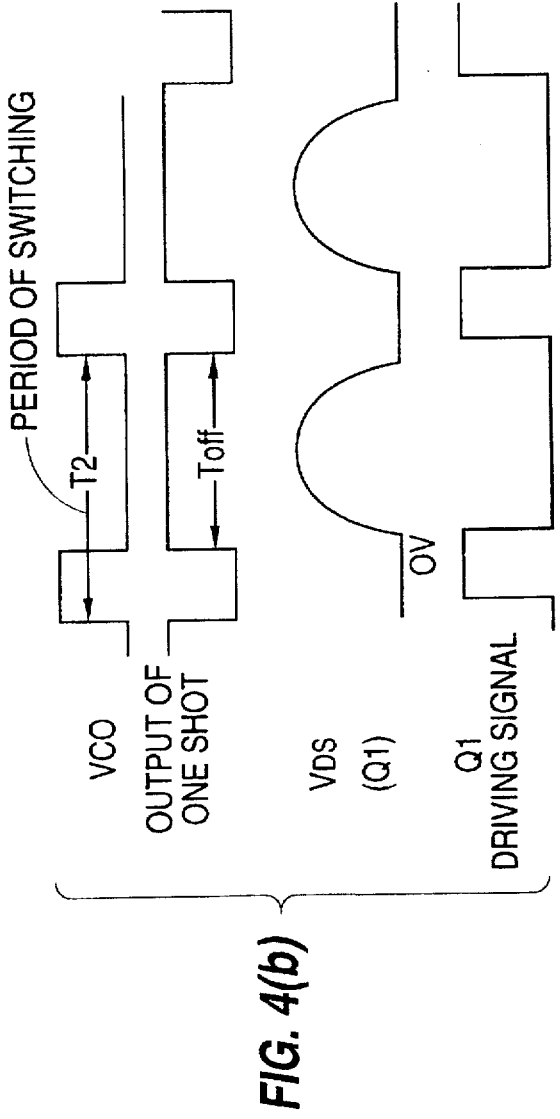
FIG. 4(a)
FIG. 4(b)

VOLTAGE RESONANCE INVERTER CIRCUIT FOR DIMABLE COLD CATHODE TUBES

BACKGROUND OF THE INVENTION

1. Field of the Invention

The present invention relates to an inverter apparatus for supply of electric power to a load which has to be controlled over a wide range of currents, and more specifically, to an inverter apparatus appropriate for use with a light source employing a dimness adjustable cold cathode tube.

2. Description of the Prior Art

Inverter apparati are provided for converting a direct current of electric power to an alternating current form and are also known as an inverse converters for use in a variety of electric systems.

FIG. 6 shows a circuit diagram of a conventional inverter apparatus specified for a discharge tube. As shown in FIG. 6, a booster transformer 10 in a Royer oscillator circuit comprises a primary coil 10P, a secondary coil 10S, and a feedback coil 10F. The Royer oscillator circuit includes NPN switching transistors 11 and 12 as well as the booster transformer 10. There are also provided a capacitor 13 for voltage resonance and a choke coil 14. Accordingly, when the transistors 11 and 12 are not conductive, their voltage outputs have a sine-waveform and the waveforms of voltages at the primary coil 10P and secondary coil 10S of the transformer 10 are also sine-waves. The choke coil 14 is connected at input to a DC/DC converter described later and at output to a cold cathode tube 31.

As the inverter performs self-oscillation, its output delivers a high voltage of sine-wave having a frequency of some tens KHz and hence, the cold cathode tube 13 is illuminated. Also, an integrated circuit (IC) 20 is provided which serves as a step-down chopper for controlling the base of a PNP switching transistor 21 which is a component of the DC/DC converter. The IC 20 comprises an oscillator OSC for producing a triangle wave, two operational amplifiers A1 and A2 for comparing action, a PWM comparator COMP for comparing between output of the oscillator OSC and output of one of the two operational amplifiers A1 and A2, and an output transistor 113 driven by the PWM comparator COMP for conducting the base of the PNP switching transistor 21. The PWM comparator COMP of the IC 20 has two comparing inputs, one connected to the oscillator OSC and the other to the two operational amplifiers A1 and A2. The output of the oscillator OSC is compared with a higher one of the two voltage outputs of their respective operational amplifiers A1 and A2. The IC 20 will now be referred to as a DC/DC converter controlling IC for ease of the description so long as its arrangement is not modified but may be used for other applications. Further shown are a fly-wheel diode 22, a choke coil 23, and a capacitor 24 which constitute in combination an LC filter. Denoted by 25 and 26 are a capacitor and a resistor respectively for determining the frequency of oscillation. There are C and R elements 27 to 30 for adjusting the paired inputs of the operational amplifiers A1 and A2 in phase with each other in the IC 20. Two diodes D15 and D16 are connected for rectifying positive components of a discharge current across the cold cathode tube 31. Elements 18 and 19 are a resistor and a capacitor, respectively, which form a lowpass filter for shaping the current waveform. The output of the lowpass filter is connected to a positive input of the operational amplifier A2 in the DC/DC converter controlling IC 20. In action, a voltage which is proportional to an average of positive cycles of the discharge current appears across the capacitor 19.

The voltage is then compared by the operational amplifier A2 with a reference voltage of the DC/DC converter controlling IC 20. A resultant voltage output is proportional to a difference between the two voltages. The resultant voltage output is fed to the PWM comparator COMP where it is compared with the triangle waveform of the oscillator OSC in the DC/DC converter controlling IC 20, as shown in FIG. 7. If the discharge current is increased by any incident, the voltage output of the operational amplifier A2 is shifted from the line B to the line A. This causes the output of the PWM comparator to shift from the line C to the line D in FIG. 7. Accordingly, the on-time of the PNP switching transistor 21 is decreased attenuating the voltage output of the DC/DC converter and thus the source voltage of the Royer oscillator circuit. As the result, the discharge current is decreased. In other words, the discharge current can be controlled to a constant rate. Denoted by 32 and 33 are resistors for adjusting the voltage output of the DC/DC converter to a constant level. If the cold cathode tube 31 is not installed, the resistors 32 and 33 detect and control the voltage output of the DC/DC converter for setting the voltage across the secondary coil 10S of the booster transformer 10 to a constant level before starting a discharge action. The joint between the two resistors 32 and 33 is connected to the positive input of the operational amplifier A1 in the DC/DC converter controlling IC 20, thus forming a negative feedback loop and allowing a constant voltage output from the DC/DC converter. Both outputs of the operational amplifiers A1 and A2 are OR connected so that a higher level of the two outputs of the amplifiers A1 and A2 is selectively transferred to the PWM comparator COMP.

It is known to use a semi-class E voltage resonance inverter for increasing the operational efficiency. The semi-class E voltage resonance inverter is however not favorable to operate zero-voltage switching of its power switch in response to a variable change in the input voltage. In the non-zero voltage switching mode, it may produce not negligible levels of switching noise and loss. It is thus an object of the present invention to provide a voltage resonance inverter circuit capable of performing a zero-voltage switching action whenever a change in the input voltage occurs.

SUMMARY OF THE INVENTION

For achievement of the above object of the present invention, a voltage resonance inverter circuit is provided having a serial resonance circuit provided at the primary side of a booster transformer, a controller circuit for turning on and off the serial resonance circuit by conducting a switching element at the timing of phase advanced from the resonance frequency of the serial resonance circuit, and a load provided at the secondary side of the booster transformer, and more specifically, is characterized by a comparator for detecting an input voltage of the voltage resonance inverter circuit, a switch circuit for switching the frequency of the resonance circuit, and a controlling means for shifting the resonance frequency of the resonance circuit to a higher rate when the input voltage is higher.

The capacitance for voltage resonance action is decreased when the input voltage becomes higher, thus increasing the characteristic impedance of the resonance circuit. Accordingly, the resonance voltage is increased in amplitude enough to allow the switching element to operate a zero-voltage switching action.

BRIEF DESCRIPTION OF THE DRAWINGS

FIGS. 4(a) and 4(b) are a waveform diagram showing one action of the embodiment of the present invention.

DESCRIPTION OF THE PREFERRED EMBODIMENTS

Figure 1:
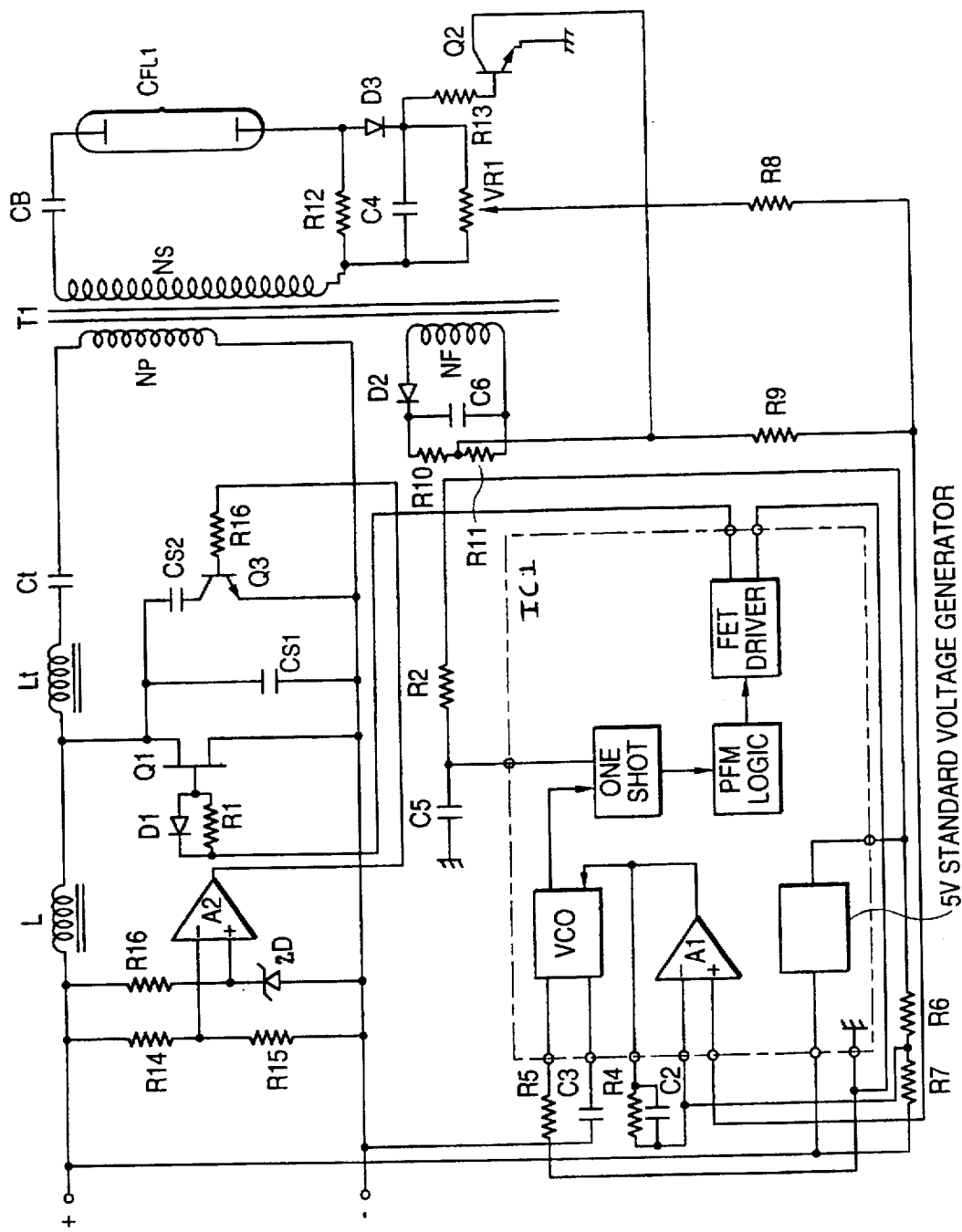
FIG. 1 is a circuit diagram showing one embodiment of the present invention.

One preferred embodiment of the present invention will be described in details referring to the accompanying drawings. FIG. 1 is a circuit diagram of an inverter apparatus provided with a cold cathode tube CFL1 as the load.

Figure 2:
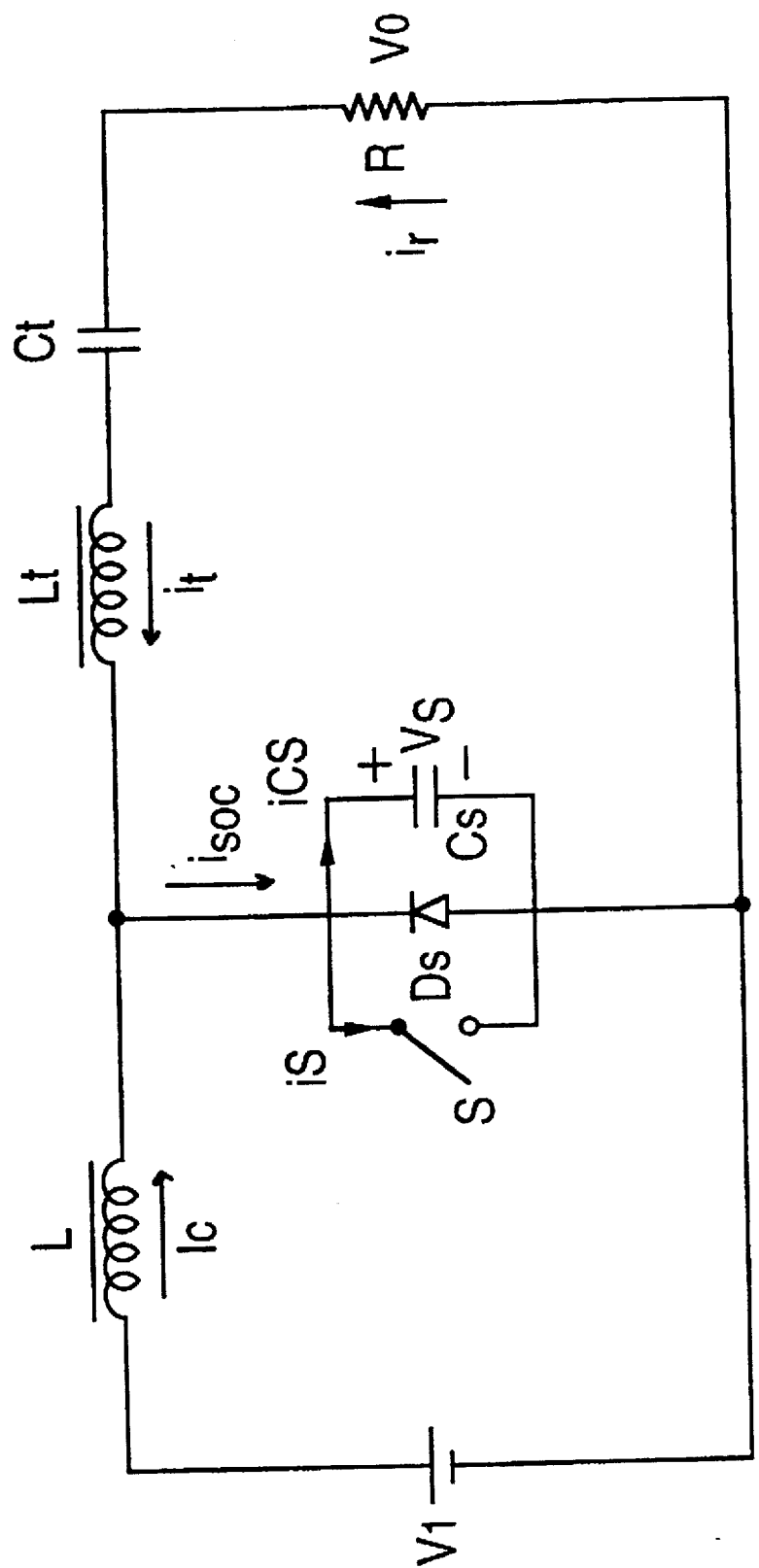
FIG. 2 is a diagram of a semi-class E type voltage resonance inverter.

For controlling the discharge current across CFL1 to a constant rate, the waveforms shown in FIG. 3 allows a source voltage of its Royer oscillation circuit or an output voltage of its DC/DC converter to be varied depending on the discharge current. In the apparatus of the present invention, its semi-class E voltage resonance inverter directly drives cold cathode tube CFL1. As known, the semi-class E voltage resonance inverter is capable of producing a sine-wave output as a current across its power switching element has a sine-wave component and a voltage supplied to its switch has a sine-wave form. The principle of action of the semi-class E voltage resonance inverter will now be explained referring to FIG. 2. FIG. 2 illustrates a basic circuit of the semi-class E voltage resonance inverter. As shown, the choke coil is a reactor L of its current is approximately a direct current Ic. An inductor Lt and a capacitor Ct constitute a resonance circuit. Through turn-on and turn-off actions of the switch, a pulse form of voltage is supplied to an RLC tuning circuit. When the switching frequency is slightly higher than the Lt-Ct resonance frequency, a current across R-Lt-Ct in the tuning circuit is approximately a sine-wave. In that case, the R-L-C tuning circuit has an inductive reactance and its current ir is out of phase with the voltage which is a fundamental wave of the switch voltage Vs. As $I_c = i_{sdc} + i_r$ is established, $I_{sdc}$ across a parallel circuit comprising a switch S, a diode DS, and a capacitor CS is calculated by subtracting the sine-wave ir from the direct current Ic and its waveform is a sine-wave.

Figure 3A:
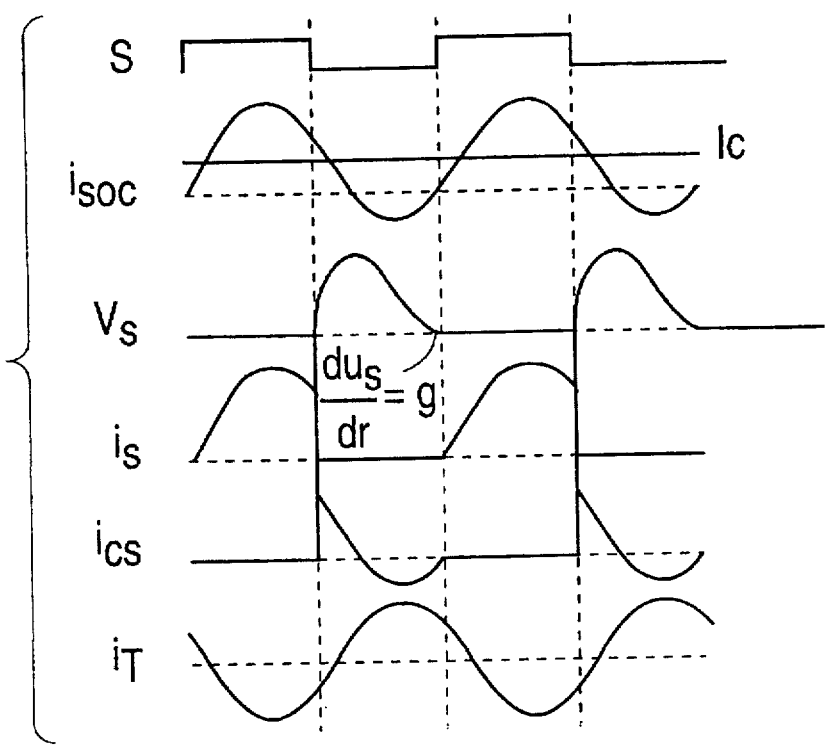
FIGS. 3(a) and 3(b) are an operating waveform diagram of a class E resonance inverter.
Figure 3B:
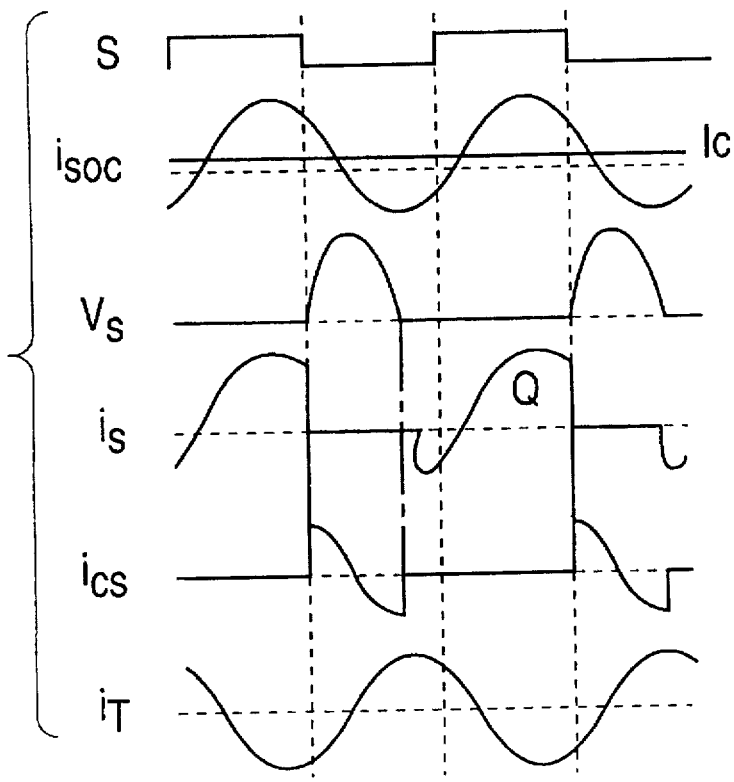

FIG. 3(a) shows operating waveforms in the class E resonance inverter with the switch having 50% of a duty. When the switch S is turned off, the sine-wave current flows across the capacitor Cs which is then charged and the voltage Vs rises up from zero to form a sine-wave. Accordingly, the turn off action of the switch triggers zero voltage, non-zero current switching. The switch voltage Vs drops in a near-zero gradient of dVs/dt at an optimum load $R_{opt}$ as shown in FIG. 3(a). When Vs=0 and dVs/dt=0, the switch S is turned on. If the resistance load is smaller than $R_{opt}$, the voltage Vs of the switch is clamped to zero, as shown in FIG. 3(b), and allows the switch S to remain closed. This is a semi-class E action implementing zero voltage switching similar to the action of a voltage resonance switch. When the circuit is used as a switching regulator, the class E action cannot be executed throughout the full-scale variable range of load and input voltages but the semi-class E action will be feasible. Since the impedance in the R-L-C tuning circuit is highly responsive to the switching frequency, control of the output voltage Vo (=ir) with switching frequency modulation will minimize a change in the switching frequency.

As shown in FIG. 1, there is provided a booster transformer T1 having a primary coil Np, a secondary coil Ns, and a feedback coil Nf. Denoted by Q1 is an N-channel power MOSFET which serves as a switching element. L is a choke coil. A serial composite inductance comprising Lt and a leakage inductance Ig of the transformer T1 constitutes, together with a capacitor Ct, a resonance circuit which is coupled to cold cathode tube CFL1 by transformer T1. The resonance frequency of the resonance circuit is expressed by:

$$Fr = \frac{1}{2\pi \sqrt{(Lt + lg)Cs1 \cdot C2/(Cs1 + C2)}}$$

where C2 is the transformer primary conversion value of a ballast capacitor CB and expressed by $C2=n2CB$, n being a ratio of primary windings to secondary windings. Also, Cs1 is a voltage resonance capacitor. The capacitor Cs1 operates with the choke coil L to produce a sine-wave voltage between drain and source when the switching element Q1 is not conducted. A voltage resonance switching IC controls the gate of the switching element Q1. The voltage resonance switching IC comprises a voltage-controlled oscillator (VCO), an operational amplifier A1, a switching frequency modulator circuit, (PFMLOGIC), and a FET driver driven by PFMLOGIC for conducting the gate of the switching element Q1. There are provided a resistance R4 and a capacitor C2 for adjusting the two inputs of the operational amplifier A1 in phase with each other in the voltage resonance switching IC. A C-R element comprises R5 and C3 for determining the oscillation frequency of the voltage-controlled oscillator (VCO). R6 and R7 are resistors for DC biasing at the negative input of the operational amplifier A1 in the integrated circuit. There are also provided a gate drive resistor R1 for the switching element Q1, a speed-up diode D1 for releasing a gate accumulated charge, and a resistor R12 for detecting a clamp current. A combination of a diode D3 and a capacitor C4 is provided for detecting the positive cycles of a lamp current to produce direct current and its output is transferred through a lamp current setting variable resistor VR1 and a resistor R8 to the positive input of the operational amplifier A1 in the integrated circuit. More particularly, the center tap of the variable resistor VR1 draws a voltage proportional to an average of the positive cycles of discharge current and sends it to the operational amplifier A1 where the this voltage is compared with a stored reference voltage of the integrated circuit to calculate a difference. A resultant voltage output proportional to the difference is transferred to the input of the voltage-controlled oscillator (VCO) for controlling its oscillation frequency. Accordingly, if the discharge current is increased by any incident, the output of the operational amplifier A1 rises thus increasing the oscillation frequency of the voltage-controlled oscillator VCO. In response to a decay of the output of the voltage-controlled oscillator VCO, a monostable multivibrator (ONESHOT) is activated producing a high level output. The output of the monostable multivibrator is maintained at the high level by a resistor R2 and a capacitor C5 throughout a duration which may be determined by a pulse-width setting time constant of the monostable multivibrator.

FIG. 4 illustrates waveforms at relative points in the apparatus, in which Toff is determined considering a variation in the performance of the choke coil 1 and voltage resonance capacitor Cs and a change in the resonance frequency due to thermal variation so that the semi-class E action is successfully carried out. When the oscillation frequency increases with Toff remaining unchanged, the on duration of the switch is decreased thus lowering the input current of the cold cathode tube CFL1 to a constant rate. If the lamp current drops, the output of the operational amplifier A1 is decreased thus lowering the oscillation frequency of the voltage-controlled oscillator and allowing the supply of a constant current.

Figure 5A:
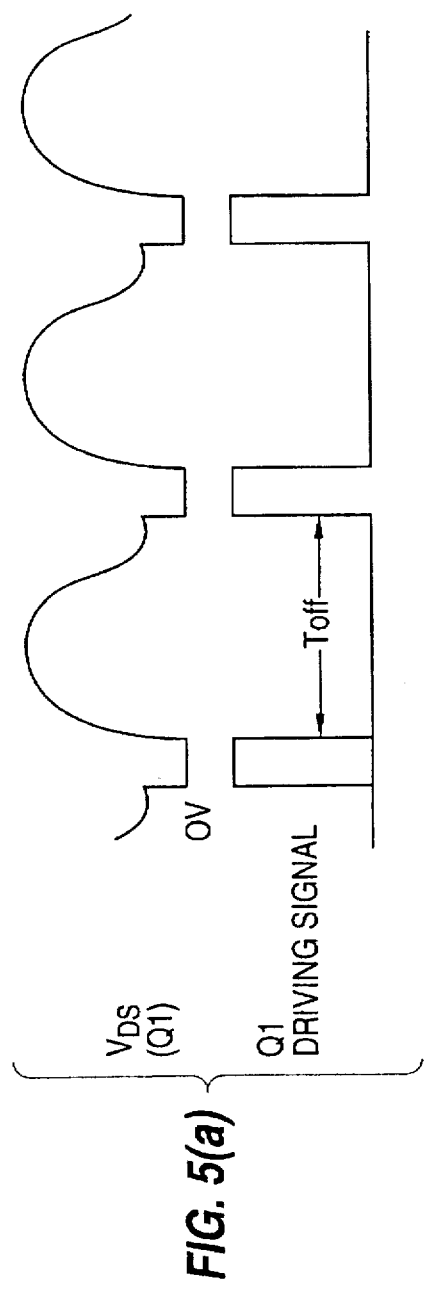
FIGS. 5(a) and 5(b) are a waveform diagram showing another action of the embodiment of the present invention.

For starting a discharging action in the cold cathode tube CFL1, the cold cathode tube CFL1 has to be loaded with a high voltage of about 1 kV. This release voltage may be set, as shown in FIG. 5, by dividing the voltage at the secondary coil Ns of the booster transformer T1, rectifying it with a combination of a diode and a capacitor, and transmitting it to the positive input of the operational amplifier A1 in the voltage resonance switching IC. The disadvantage of this setting is that the resistor of high voltage type is needed and the stable action of non feedback loop will be declined due to a time delay caused by the resistors and capacitors. For correcting the disadvantage, the booster transformer T1 is provided with a feedback coil Nf as shown in FIG. 1. In action, a voltage output of the feedback coil Nf is rectified by a diode D2 and a capacitor C6 and divided in half by two resistors R10 and R11. A half output is then transferred through a resistor R9 to the positive input of the operational amplifier A1 in the integrated circuit for feedback. Assuming that the number of turns and the voltage of the secondary coil Ns are ns and Es respectively, and the number of turns and the voltage of the feedback coil Nf are nf and Ef respectively, the voltage Es of the secondary coil Ns is expressed by Es=(ns/nf)*Ef. Hence, Es can be maintained constant by controlling Ef regardless of the level of DC voltage to be supplied. Also, the voltage of the feedback coil Nf may be identical in the level to the input voltage of the operational amplifier A1 thus remaining low and hardly producing any phase delay.

The collector of a switching transistor Q2 is connected to the joint between the resistors R9, R10, and R11. If cold cathode tube CFL1 is disconnected or before the discharge action is started, the voltage across the capacitor C4 is zero and the switching transistor Q2 remains not conductive. Accordingly, the voltage at the secondary coil Ns of the booster transformer T1 is maintained constant regardless of an input level of the DC voltage by the negative feedback action through the resistors R10, R11, and R9 and the operational amplifier A1. When cold cathode tube CFL1 is connected and its discharge current flows, the switching transistor Q2 is turned on with the voltage across the capacitor C4 set to more than 0.7 volts. Accordingly, the resistors R10 and R11 interrupt the constant voltage action and allow only the constant current action with the operational amplifier A1.

When the input voltage rises up, the oscillation frequency of the voltage resonance switching integrated circuit is increased to maintain the lamp current to a constant rate. More particularly, the on time of the power MOSFET Q1 becomes short and the resonance energy is decreased, thus declining the amplitude of the resonance voltage. This causes a non-zero voltage switching action as shown in FIG. 5 (a). Meanwhile, there are provided a comparator A2 for detecting the input voltage, a transistor Q3 for switching the resonance capacitor, and a Zener diode ZD for generating a reference voltage for the input voltage detection.

When the input voltage is Vin and Vin[R15/(R14+R15)]<Vz (Vz being a voltage of the Zener diode ZD) is established, the comparator A2 turns to high to conduct the transistor Q3 and thus the voltage resonance capacitance is Cs1+Cs2.

Figure 5B:
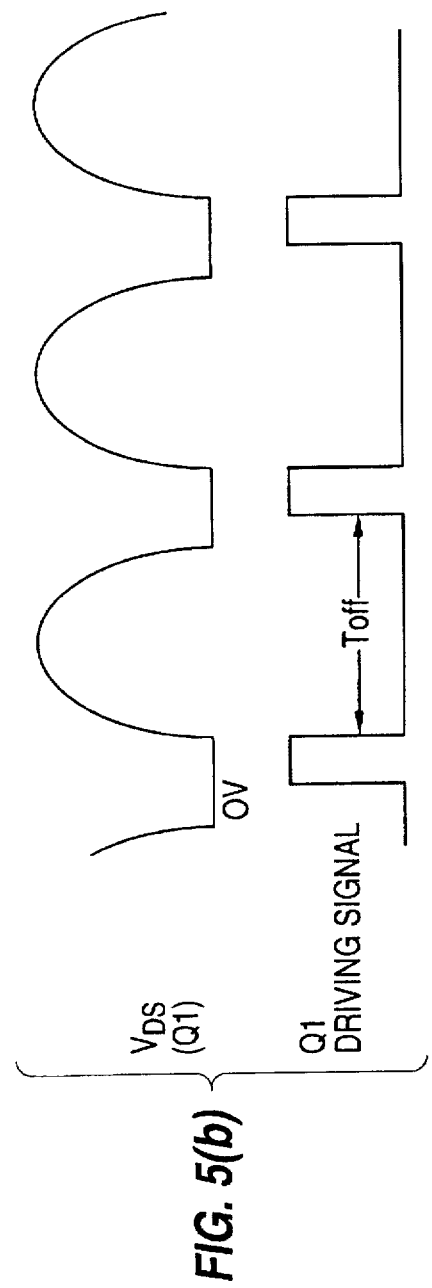
Figure 6:
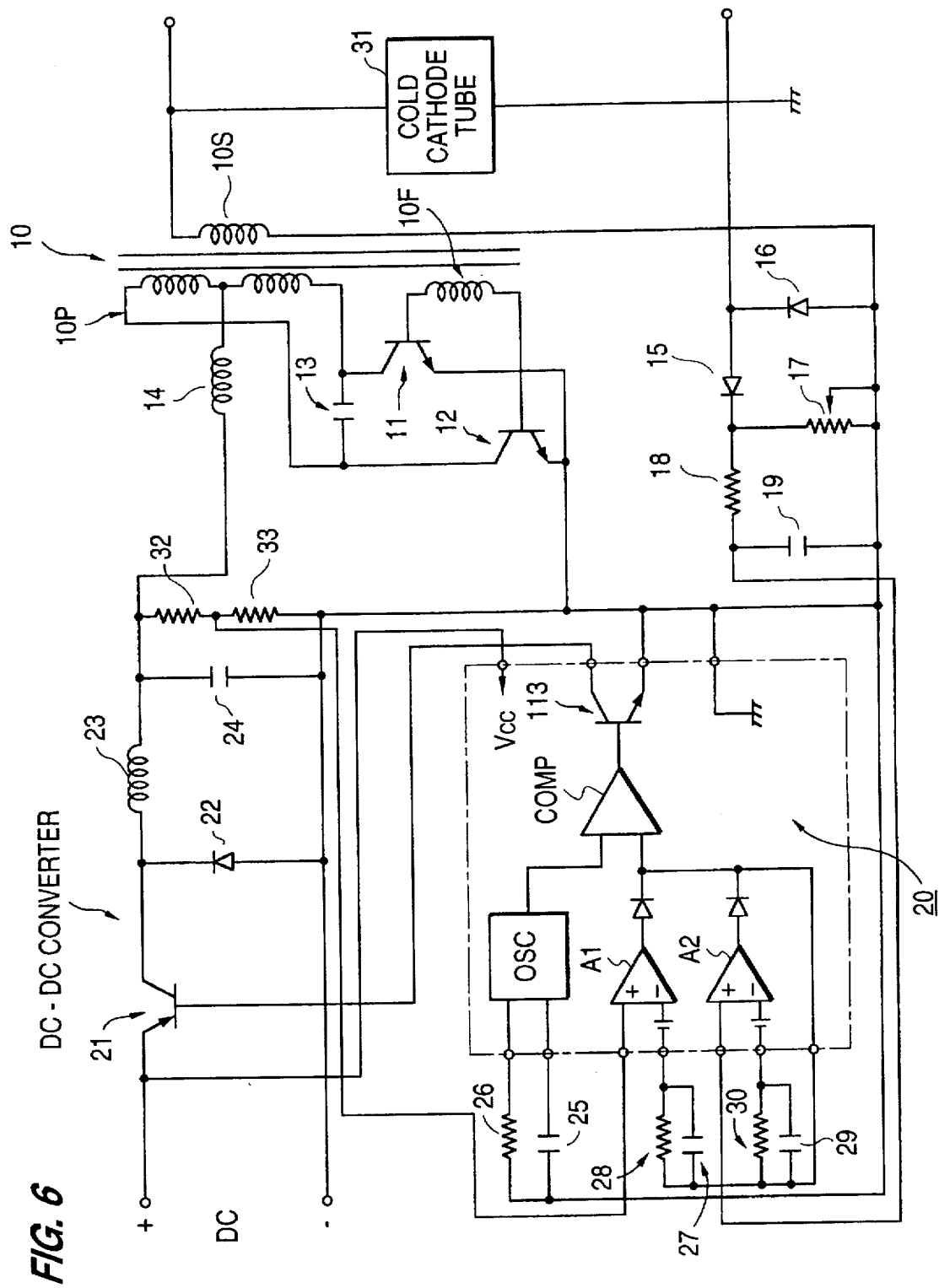
FIG. 6 is a circuit diagram of a prior art.
Figure 7:
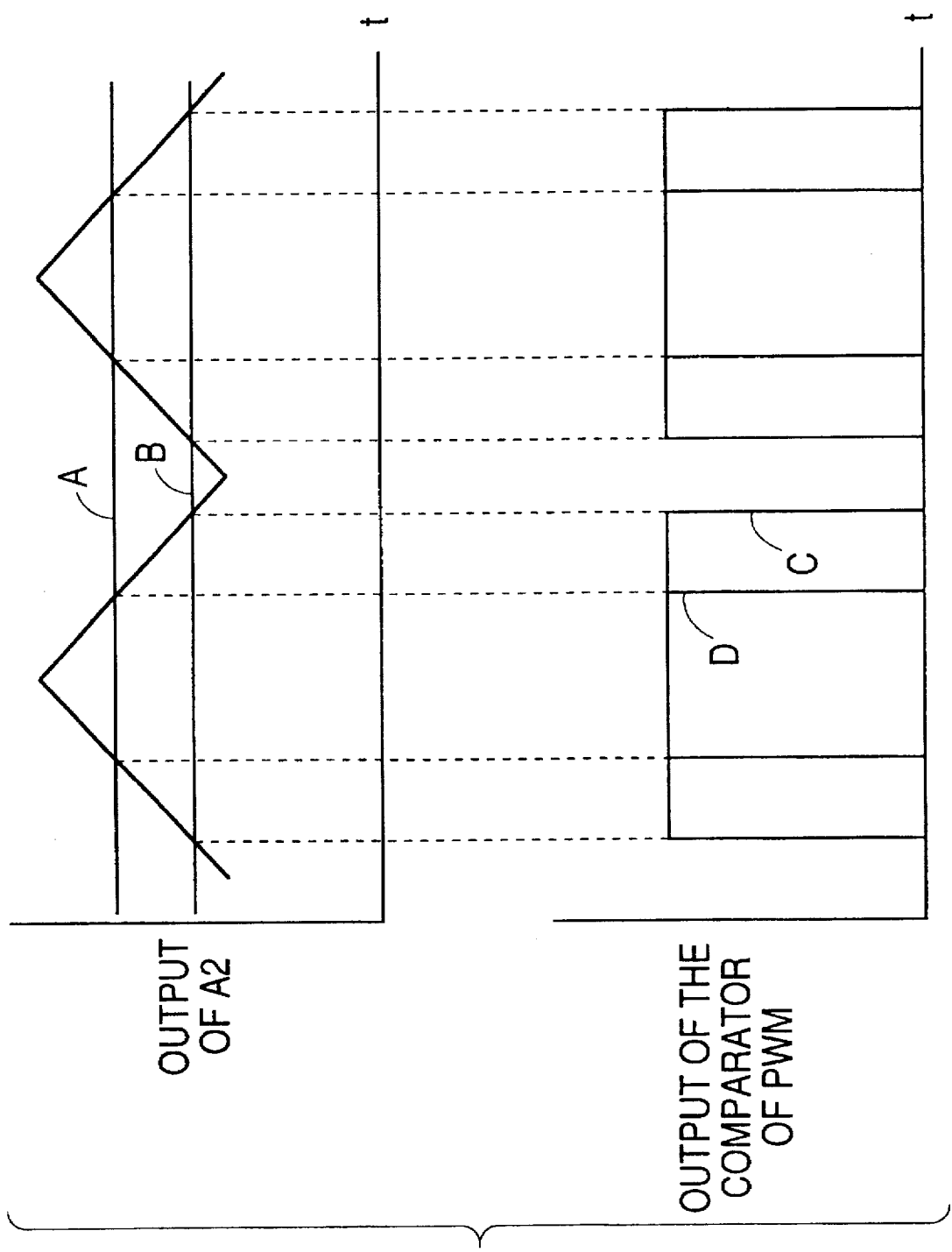
FIG. 7 is an operating waveform diagram of the prior art.

If Vin[R15/(R14+R15)]>Vz is given, the comparator A2 turns to low to disconnect the transistor Q3 and thus the voltage resonance capacitance is Cs1. As the result, the resonance frequency and the characteristic impedance are increased as shown in FIG. 5(b), increasing the amplitude of the resonance voltage. Accordingly, the zero-voltage switching action is maintained.

Figure 8:
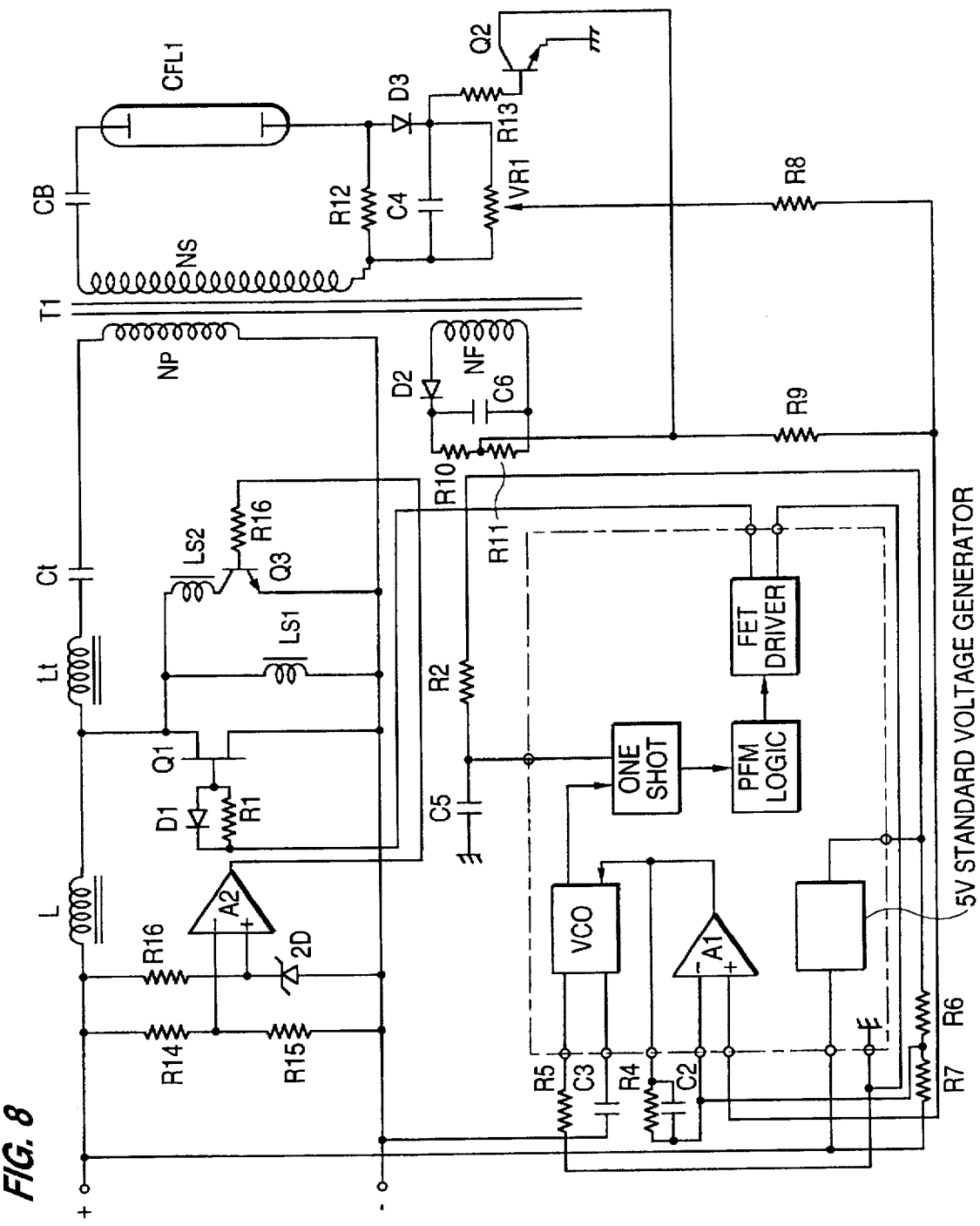
FIG. 8 is a circuit diagram of another embodiment of the present invention.

Although the characteristic impedance in the resonance circuit is increased by decreasing the voltage resonance capacitance in response to an increase of the input voltage according to the embodiment, it may be gained by switching a plurality of voltage resonance inductors from one to another according to the input voltage change as shown by LS1 and LS2 in FIG. 8. Also, the number of the voltage resonance capacitors or inductors is not limited to two; three or more will be provided with additional switching circuits for allowing more precise actions of the frequency switching.

According to the present invention, the semi-class E voltage resonance inverter allows its voltage resonance capacitors to be switched from one to the other according to a level of the input voltage so that the switching element Q1 is constantly turned on for zero-voltage switching. This will reduce the switching loss and increase the operational efficiency of the inverter. Simultaneously, the switching noise will be attenuated.

As set forth above, the present invention has the voltage resonance inverter including a power switching element, thus eliminating one of the power switching elements from the entire system and increasing the operational efficiency of the same. Also, the output of the inverter is used as a start-up pulse signal eliminating an extra start-up circuit. Hence, the number of components in the apparatus will considerably be reduced. The start-up pulse signal is preferably of high frequency pulse form which is ⅕ to ½ in the amplitude of a conventional low-frequency pulse signal. The voltage resonance circuit is made of a commercially available voltage resonance controller IC which contributes to the minimum number of the components and thus the smaller dimensions of the apparatus. Furthermore, the capacitance of the voltage resonance capacitor is decreased in response to an increase of the input voltage thus increasing the characteristic impedance of the resonance circuit. This will increase the amplitude of the resonance voltage triggering a zero-voltage switching action.

What we claim is:

1. A voltage resonance inverter circuit having a serial resonance circuit provided at a primary side of a booster transformer, a controller circuit for turning on and off the serial resonance circuit by conducting a switching element at the timing of phase advanced from the resonance frequency of the serial resonance circuit, and a load provided at a secondary side of the booster transformer, comprising:

a comparator for detecting an input voltage of the voltage resonance inverter circuit;

a switch circuit for switching the frequency of the resonance circuit; and a controlling means for shifting a resonance frequency of the resonance circuit to a higher rate when the input voltage is higher.

2. A voltage resonance inverter circuit according to claim 1, wherein the load provided at the secondary side of the booster transformer is a cold cathode tube.

3. A voltage resonance inverter circuit according to claim 1, wherein the switch circuit for switching the resonance frequency of the resonance circuit is a circuit for changing a capacitance of a capacitor.

4. A voltage resonance inverter circuit according to claim 1, wherein the switch circuit for switching the resonance frequency of the resonance circuit is a circuit for changing an inductance.

* * * * *